T. J. LOFTUS.
GEAR WHEEL.
APPLICATION FILED JUNE 9, 1913.
1,093,279.
Patented Apr. 14, 1914.
Fig. 1.
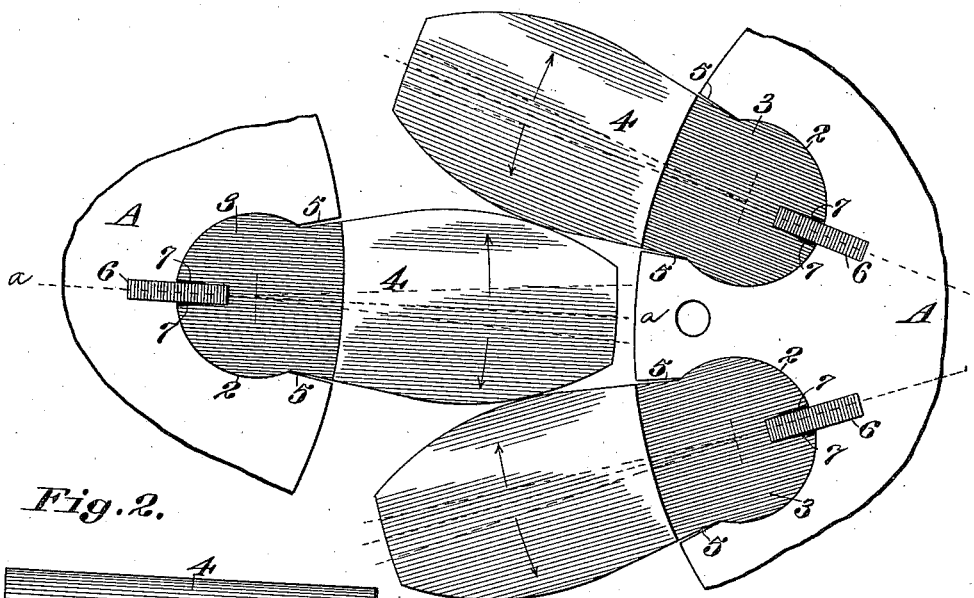
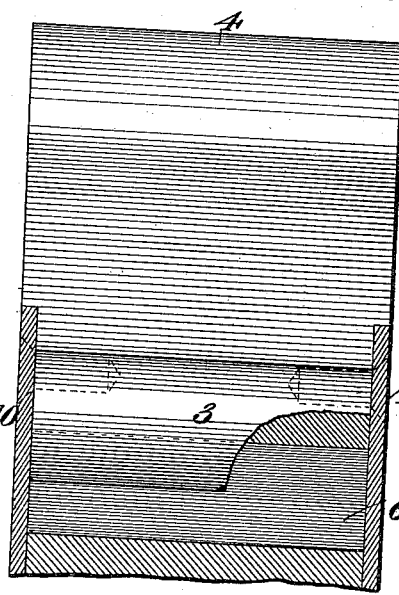
Fig. 2.
Fig. 3.
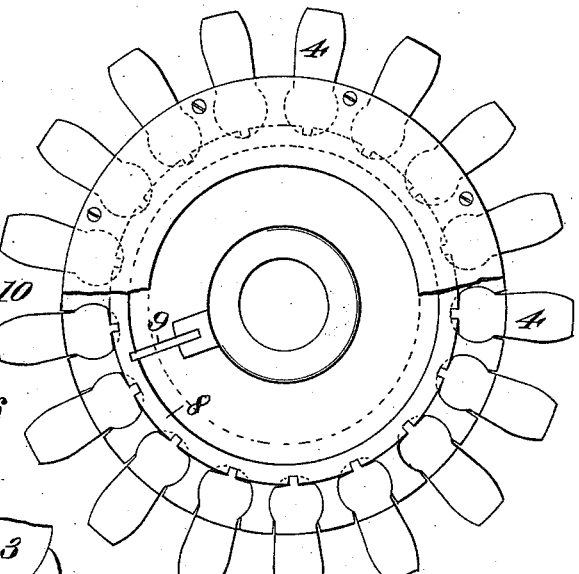
Fig. 4.
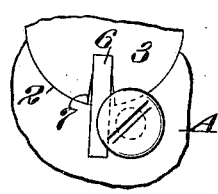
WITNESSES:
Charles Rickles
R. S. Berry
INVENTOR
Thomas J. Loftus,
BY G. H. Strong.
ATTORNEY

UNITED STATES PATENT OFFICE.

THOMAS J. LOFTUS, OF CASTELLA, CALIFORNIA, ASSIGNOR OF ONE-HALF TO HARMON BELL, OF OAKLAND, CALIFORNIA.

GEAR-WHEEL.

1,093,279.  Specification of Letters Patent.  Patented Apr. 14, 1914.

Application filed June 9, 1913.  Serial No. 772,571.

*To all whom it may concern:*

Be it known that I, THOMAS J. LOFTUS, a citizen of the United States, residing at Castella, in the county of Shasta and State of California, have invented new and useful Improvements in Gear-Wheels, of which the following is a specification.

This invention relates to a gear-wheel, and particularly pertains to a gear-wheel having yieldable teeth.

It is the object of this invention to provide a gear-wheel having teeth which will yield when subjected to excessive strains or shock, so as to obviate breaking of the teeth, and which will operate to cushion the impact of the teeth with the teeth of a companion gear-wheel moving into mesh therewith, and thereby render the gears comparatively noiseless when in motion.

A further object is to provide a gear-wheel with resiliently-mounted teeth, which will insure contact of the bearing faces of intermeshing teeth and a consequent even pull on each tooth, and which will serve to compensate for unequal spacing of the teeth.

Another object is to provide a removable and renewable yieldable tooth for gear wheels.

The invention primarily resides in a wheel rim formed with sockets on its peripheral edge, gear-teeth mounted in the sockets to rock circumferentially of the rim, and spring members operating on the teeth to normally maintain them in radial relation to the wheel rim.

The invention further consists of the parts and the construction and combination of parts as hereinafter more fully described and claimed, having reference to the accompanying drawings, in which—

Figure 1 is a view in elevation of the preferred form of the invention, illustrating the manner of mounting the gear-teeth on the wheel rim. Fig. 2 is a detail section on the line *a—a* of Fig. 1. Fig. 3 is a view in elevation of a modified form of the invention. Fig. 4 is a detail of a device for retaining the teeth on the wheel-rim.

In the drawings A represents a wheel rim which is formed with a series of transversely-extending channels or sockets 2 on its outer periphery. The channels or sockets 2 are segmental in cross-section and are adapted to receive a cylindrical member 3, formed on the base of detachable gear teeth 4. The sockets 2 and the members 3 form pivotal supports for the gear teeth 4, to permit of a rocking movement of the gear teeth 4 in a circumferential direction on the wheel rim A. Shoulders 5 are formed on the edges of the sockets 2, which shoulders are designed to abut against the gear teeth 4 at their intersection with the cylindrical member 3, to limit the rocking movement of the gear teeth. Means are provided for normally maintaining the gear teeth 4 in radial relation to the wheel rim A, which means is of a resilient character and adapted to restore the gear teeth 4 to their normal positions when the latter have been released after being moved out of their radial positions. This means, as shown in Figs. 1 and 2, consists of plate springs 6 which extend transversely through the wheel rim A and are rigidly mounted thereon. The outer edges of the springs 6 extend into grooves or channels 7 formed on the cylindrical members 3. The grooves or channels 7 are enlarged at their outer ends to permit a slight bending movement or flexure of the springs 6. By thus providing a spring 6 for each tooth 4, the various teeth throughout the periphery of the wheel rim A may move independently of the others. If desired, the portions 3 of the gear teeth 4 may be connected to a ring 8, as shown in Fig. 3, disposed alongside of the wheel rim A concentric therewith; a single spring member 9 mounted in the hub of the wheel engaging the ring 8 and operating to retain the latter in such position that the various teeth 4 will be disposed radially of the wheel.

By constructing a toothed wheel in the manner described, the teeth will have a rocking movement peripherally of the wheel, which movement will be cushioned by the action of the spring members connecting the teeth with the wheel rim. This arrangement allows the teeth to yield when subjected to excessive strains or shock, thereby preventing breaking of the gear-teeth and rendering the gears noiseless in their operation, and at the same time equalizing strains on the different teeth while in mesh so that equal force will be exerted on each tooth. The springs 6 and 9 may be made of sufficient tension to maintain the gear teeth 4 in their normal radial positions during ordinary work, and to give or yield only when excessive strains are brought to bear on the gear teeth. However, by providing means for limiting the rocking movement of the gear teeth 4, the springs 6 may be made only of sufficient tension to cushion the impact of the gear teeth with the teeth of an adjacent wheel and to restore the gear teeth to their normal radial position when moved out of mesh with the adjacent wheel.

In assembling the parts the portions 3 of the gear teeth 4 are inserted in the sockets 2 from the ends of the latter; the springs 6 being placed in position either before or after the gear teeth 4 are placed in position. The gear teeth 4 and the springs 6 are held in place by means of face plates 10, mounted on the sides of the wheel rim A, as particularly shown in Fig. 2, or in any other suitable manner; a device such as shown in Fig. 4 being employed when it is desired to secure the teeth individually against displacement. This latter device comprises a bolt or screw which is screwed in the wheel rim, with its head overlapping the spring 6 and the portion 3 of a gear tooth.

From the foregoing it will be seen that I have provided a wheel having teeth on its outer periphery adapted to have a resilient or yieldable movement, and which is so constructed and arranged that the teeth may be readily removed and replaced when broken or worn.

Having thus described my invention what I claim and desire to secure by Letters Patent is:

1. A yieldable tooth for gear-wheels comprising a tooth member mounted to have rocking movement, and a resilient member connected with the tooth member to normally maintain the latter in a central position.

2. A gear-wheel comprising a rim, a series of teeth mounted to rock circumferentially of the rim, and resilient connections between the teeth and rim.

3. In a gear-wheel, a rim formed with sockets on its peripheral edge, gear-teeth mounted in the sockets to rock circumferentially of the rim, and spring connections between the rim and gear teeth to normally maintain them in radial relation to the rim.

4. In a gear-wheel, a rim formed with sockets on its peripheral edge, gear-teeth mounted in the sockets to rock circumferentially of the rim, means for limiting the movement of the gear-teeth in either direction, and spring connections between the rim and gear-teeth to normally maintain them in radial relation to the rim.

5. The combination with a wheel rim, of a series of teeth mounted on the rim to have a rocking movement circumferentially thereof, and flexible members engaging the teeth and wheel rim adapted to oppose movement of the teeth in relation to the rim.

In testimony whereof I have hereunto set my hand in the presence of two subscribing witnesses.

THOMAS J. LOFTUS.

Witnesses:
 JOHN H. HERRING,
 W. W. HEALEY.